(12) United States Patent
Ross et al.

(10) Patent No.: US 7,007,232 B1
(45) Date of Patent: Feb. 28, 2006

(54) SYSTEM AND METHOD FOR FACILITATING THE PRE-PUBLICATION PEER REVIEW PROCESS

(75) Inventors: Brian Dale Ross, Ann Arbor, MI (US); Lauren Daniel Stegman, Ann Arbor, MI (US); Alnawaz Rehemtulla, Plymouth, MI (US)

(73) Assignee: Neoplasia Press, Inc., Ann Arbor, MI (US)

( * ) Notice: Subject to any disclaimer, the term of this patent is extended or adjusted under 35 U.S.C. 154(b) by 732 days.

(21) Appl. No.: 09/545,316

(22) Filed: Apr. 7, 2000

(51) Int. Cl.
*G06F 15/00* (2006.01)

(52) U.S. Cl. ............... 715/530; 715/500; 715/505; 715/751

(58) Field of Classification Search ........... 707/530, 707/500, 505, 507, 506; 345/331, 751; 715/530, 715/500, 505, 751
See application file for complete search history.

(56) References Cited

U.S. PATENT DOCUMENTS

| | | | | |
|---|---|---|---|---|
| 4,989,610 A | | 2/1991 | Patton et al. ............. 128/695 |
| 5,042,771 A | | 8/1991 | Demarest, Jr. ............ 248/451 |
| 5,164,751 A | | 11/1992 | Weyer ..................... 354/76 |
| 5,269,014 A | | 12/1993 | Ogino ..................... 395/500 |
| 5,307,262 A | | 4/1994 | Ertel ...................... 364/413.01 |
| 5,359,509 A | | 10/1994 | Little et al. ............. 364/401 |
| 5,432,657 A | | 7/1995 | Akama ................... 360/74.1 |
| 5,446,842 A | * | 8/1995 | Schaeffer et al. ......... 345/751 |
| 5,659,766 A | * | 8/1997 | Saund et al. ............. 704/9 |
| 5,706,452 A | * | 1/1998 | Ivanov ................... 345/331 |
| 5,819,032 A | * | 10/1998 | de Vries et al. .......... 709/250 |
| 5,862,223 A | * | 1/1999 | Walker et al. ............ 705/1 |
| 5,873,107 A | * | 2/1999 | Borovoy et al. .......... 707/501.1 |
| 5,890,177 A | * | 3/1999 | Moody et al. ............ 707/511 |
| 6,070,177 A | * | 5/2000 | Kao et al. ................ 707/512 |
| 6,088,702 A | * | 7/2000 | Plantz et al. ............. 707/103 |
| 6,122,643 A | * | 9/2000 | Paik et al. ............... 707/104 |
| 6,151,609 A | * | 11/2000 | Truong ................... 707/505 |
| 6,167,368 A | * | 12/2000 | Wacholder ............... 704/9 |
| 6,212,517 B1 | * | 4/2001 | Sato et al. ............... 707/2 |
| 6,223,165 B1 | * | 4/2001 | Lauffer ................... 705/8 |

OTHER PUBLICATIONS

Pope et al., "Using the web for peer review and publication of scientific journals", Sep. 1998, pp. 1-10.*

(Continued)

*Primary Examiner*—Stephen Hong
*Assistant Examiner*—Thu V. Huynh
(74) *Attorney, Agent, or Firm*—Procopio Cory Hargreaves & Savitch LLP

(57) ABSTRACT

An improved method for facilitating the peer review process in scholarly publications is presented. This improved method streamlines and compresses the review process, eliminating unnecessary delays and costs inherent in the traditional process. The present invention implements a computer based manuscript tracking process the uses the World Wide Web to allow ubiquitous access to the manuscript under review. This ubiquitous access works in conjunction with automatic generation of potential reviewers and instant notification to authors, editors, and reviewers of significant milestones in the peer review process. Authors are allowed to communicate with anonymous reviewers to reduce the number of revisions leading to approval. Additionally, multiple authors are allowed to collaborate during the manuscript creation process as well as the manuscript review process. This allows several geographically disperse authors to conveniently co-author a manuscript. It additionally allows the author or several authors to respond to comments from the reviewer prior to an editor reading the review.

2 Claims, 17 Drawing Sheets

OTHER PUBLICATIONS

Sumner et al., "Open Peer Review & Argumentation Loosening the Paper Chains on Journals", Sep. 1996, pp. 1-10.*

Maddison et al., "Peer review", copyright 1998, pp. 1-3.*

Mathews et al., "Electronic Management of the Peer Review Process", May 6-10, 1996, pp. 1-21.*

First Monday, "First Monday Basics", First Monday Peer-Reviewed Journal on the Internet, 1996.

Roberts, Peter, "Scholarly Publishing, Peer Review and the Internet", First Monday, Apr. 1999.

Ross, Brian, "Neoplasia", Conference Reporter, AACR Conference Apr. 10-14, 1999.

Ross, Brian, "Editorial", Neoplasia, vol. 1, No. 1, Apr. 1999.

Ross, Brian, "Editorial", Neoplasia, vol. 3, No. 1, Jan. 2001.

Sosteric, Mike, "Electronic Journals: The Grand Information Future?", EJS vol. Two No. Two (1996).

* cited by examiner

| RATINGS | Top 5% | Top 10% | Top 25% | Top 50% | Bottom 50% | No Comment |
|---|---|---|---|---|---|---|
| Scientific Quality | ☐ | ☐ | ☒ | ☐ | ☐ | ☐ |
| Significance | ☐ | ☐ | ☒ | ☐ | ☐ | ☐ |
| Originality | ☐ | ☐ | ☒ | ☐ | ☐ | ☐ |
| Clarity | ☐ | ☐ | ☒ | ☐ | ☐ | ☐ |

COMMENTS TO THE AUTHORS

This study is a very nice experiment to validate the authors' hypothesis that radiosensitization FdUrd exposure depends on progression of cells through the S phase during drug exposure. Unfortunately the difference between the radiosensitization of the two E7-expressing clones and the parental cells is not as convincing as one would have liked. There also seem to be discrepancies between some of the reported data in the text and the tables (see below).

Specific Comments

1. Table I: The TS activity in the E7.9 clone during FdUrd exposure is much larger than that of the controls and is certainly not greater than 95% inhibited as indicated in the text (p. 8, par. 1).

2. Figure 1: Why are the data for only one experiment shown? It would seem to make more sense to show the data for all experiments with mean and standard errors for each point for the pooled data.

> We are sorry that the reviewer seemed confused by this figure. In fact, it was a plot of mean values. We have added error bars and refined the caption to make this more clear.

3. P. 5, par. 3: The use of mean inactivation dose is perhaps the best way to analyze data fitted with the linear-quadratic model, but it is really an arcane method that will not be understood by 95% of the readers. If the authors have to use this method, they should indicate that the method heavily weights the initial part of the survival curve (for example, all data above 10% surviving fraction) and therefore, heavily weights the alpha component

SYSTEM AND METHOD FOR FACILITATING THE PRE-PUBLICATION PEER REVIEW PROCESS

BACKGROUND OF THE INVENTION

1. Field of the Invention

The present invention relates generally to the field of the publishing process for scholarly articles and more specifically to the peer review process that takes place prior to the publication of scholarly articles.

2. Related Art

In scientific, technical, historical, medical, and other scholarly journals, it is typically the standard that all articles to be published are previously reviewed by competent, experienced, and neutral scholars in the field of the article. The reviewers screen submitted articles to ensure that publications in scholarly journals live up to the very high standards of the scientific method, which requires adequate documentation of repeatable experiments and logical conclusions therefrom. As is normal in the industry, at least two reviewing scholars typically must approve of the article before the editors of the journal will consider the article for publication.

In the past, this rigorous review process has been arduous and time consuming for both the journals and the authors. The first step in this process, after the article has been written, requires that the author submit several copies of the article to a selected journal for consideration. To do so, the author would make several copies of the manuscript and ship them to the publication from which the author desired consideration. Typically, the shipping would be done by first class U.S. mail or a delivery or courier service. Additionally, prior to submission the author must usually obtain Copyright Transfer and manuscript submission forms from the journal, and enclose the completed forms with the submission.

When the journal receives the hardcopy manuscript from the author, the journal records the receipt of the manuscript in a paper or computerized manuscript tracking database. The journal also sends a confirmation to the author that the manuscript has been received. Next, the editorial staff determines several potential reviewing scholars who have expertise in the particular field that is the subject matter of the article. The journal would then contact these several scholars to see if they were available and willing to review the article. If so, then the review process would begin.

The review process commences with the journal shipping a copy of the submitted article to each scholar who will review the submission. The reviewing scholars, after receiving the article, read through the article and make appropriate comments. Typically, a deadline for the review has been imposed by the journal to ensure that the reviewing scholar performs this duty in a timely fashion.

In the traditional process, after the reviewing scholar has read through and provided comments on the article, the draft article along with the comments are returned to the editors at the magazine. Once all of the reviews are complete, the editors compile the comments and evaluate the articles based on the comments from the reviewing scholars and the merits of the article. An editorial decision is then made regarding the appropriateness of the article for publication. Typically, submitted articles are (1) accepted for publication; (2) provisionally accepted for publication pending minor review; (3) provisionally accepted for publication pending a major revision of the article and resubmission for evaluation; or (4) rejected.

Once an editorial decision has been made, the decision along with the comments from the reviewing scholars are forwarded to the author. In this way, the author is provided with the status of the submission as well as feedback on how to improve the article. The author then makes revisions to the article as necessary. In the case where the author disagrees with the comments of the reviewing scholar, the author would prepare responses to the comments of the reviewing scholar, and submit those comments to the editors along with the updated draft. For articles requiring resubmission for evaluation, the peer review and article revision process could include several iterations.

After the journal receives a revised draft with responses from the author, the editors begin to review all of the material in order to make a decision about whether to publish the article. This can be an extremely time consuming process for the editors who must keep straight the original text of the article, the comments from the reviewing scholars, the edits from the author, and the responses from the author. When all of the appropriate reviews and revisions and remarks have been considered, the editorial staff then makes its decision regarding publication of the article.

When an article has been accepted, it is forwarded to copy editors who then ensure that the paper meets the journal's style criteria. The copy editors also format the manuscript into the appropriate layout for the journal. This formatting process produces an article in the form of a "galley proof," which is simply the article formatted in the correct layout for the particular journal. The galley proofs are then transmitted to the corresponding author and the responsible editorial staff for final approval. After approval, the galley proofs are typically sent to the journal's production facility for inclusion in the next edition.

The problem with the present method is that it is too time consuming and costly. In today's reduced time to market business environment, cumbersome and iterative review processes that delay publication of time sensitive material can be very costly. Therefore, what is needed is an improved method for facilitating the peer review process of scholarly manuscripts submitted to professional journals for publication.

SUMMARY OF THE INVENTION

Accordingly, the present invention presents an improved method for facilitating, streamlining, and compressing the peer review process. Using the World Wide Web ("Web"), ubiquitous access to a submitted article is provided to authors, reviewers, and editors. Moreover, the same access is provided to additional data regarding the status of the article. By doing so, the present invention provides real time, 24 hour per day access to the parties involved in the review process, and also provides a structured timeline for the review process.

The process begins with a scholar who has written an article and is seeking publication of the article. The author then submits the article to a journal for consideration. The streamlined submission process allows the author to connect to the journal Web site and upload the previously written article. The journal receives the article and immediately converts the data format of the article into a standard format, which is then approved by the author.

Next, the Web site parses the text of the article, sifting out keywords describing the content of the article. These keywords are then ranked according to their relative weight in describing the article's content and presented to the author for possible editing, reordering, and ultimately approval.

When the article has been submitted and formatted and the format and keywords have been approved by the author, potential reviewers are sought for the article. This search is conducted by cross referencing the approved keywords with keywords from scholar profile entries in the journal's database. The result of this search is a ranked list of qualified potential reviewers for selection by the editorial staff. The highest ranked potential reviewers are automatically contacted by email and requested to review the article. An abstract of the article is included in the requesting email along with other information helpful to the potential reviewer.

Potential reviewers agreeing to review the article connect to the journal Web site and accept the editors' request. Once the required number of reviewers have accepted, no additional reviewers are allowed to accept. After a reviewer has accepted, the reviewer is given password protected access to the article and can immediately begin reviewing the article.

During the review process, the author(s) has access to the status the article, including due dates for the reviews, dates for editorial decisions, scheduled publish date, and other pertinent information. When a review is complete, the reviewer submits the review to the editorial staff via email, or directly into the journal's Web site. This completed review is made immediately available to the author so that the author can respond to comments in the review.

After all of the reviews have been completed, they are compiled together with the remarks and edits from the author. The editors then make their publication decision based on the reviews, while taking into consideration the author's edits and remarks. In the case where the editors choose to not publish the article, the process can begin again after the author has revised the article, repeating as necessary until the article is in a form that is acceptable for publication.

BRIEF DESCRIPTION OF THE DRAWINGS

The details of the present invention, both as to its structure and operation, can best be understood in reference to the accompanying drawings, in which like reference numerals refer to like parts, and in which:

FIG. 5A is a software application window illustrating a prototype of an on line evaluation form including remarks entered by the author according to one embodiment of the present invention;

FIG. 14 is a software application window showing a prototype of a registration screen for a journal's Web site according to one embodiment of the present invention;

DETAILED DESCRIPTION OF THE PREFERRED EMBODIMENTS OF THE INVENTION

A. Introduction and Overview

The present invention is directed toward an improved method for facilitating the peer review process that streamlines and compresses the review process, eliminating unnecessary delays and costs inherent in the traditional process. Specifically, the invention implements a manuscript tracking process using the Web to allow an author ubiquitous access to submitting manuscripts, examination of peer reviews, and re-submission of edited drafts of the manuscript. The present invention additionally uses the Web to provide a reviewing scholar ubiquitous access to the manuscript being reviewed and the ability to provide criticism and commentary. The invention furthermore uses the Web to allow editors to consider and evaluate the peer reviews and corresponding remarks and revisions from the author. After reading this description it will become apparent to one of ordinary skill how to implement the invention in alternative embodiments and applications. As such, this detailed description of the preferred and alternative embodiments should not be construed to limit the scope or breadth of the present invention.

Figure 1:
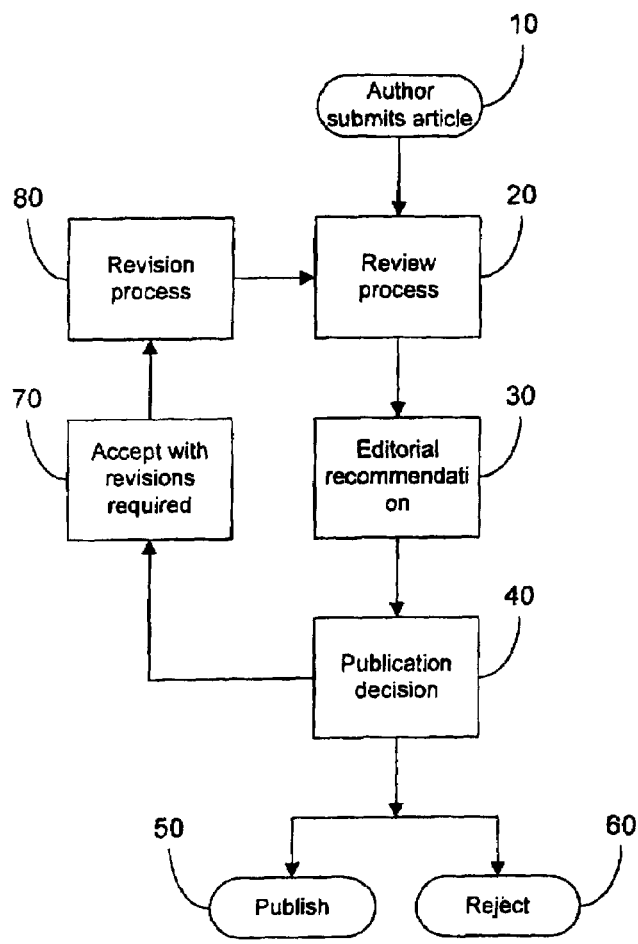
FIG. 1 is a high level overview flow diagram of the present invention.

An overview of the present invention is illustrated in FIG. 1. Initially, an author writes an article and is seeking to have that article published in a journal serving the field that is relevant to the subject matter of the article. In step 10, the author submits the article to the journal. In one embodiment, the author submits the article to the journal by connecting to the journal's Web site and uploading the article as a document. This allows the author to instantaneously submit the article to the journal.

Once the article has been submitted to the journal, the review process begins, as shown in step 20. The review process includes the selection of reviewers who are experts in the field that is the subject matter of the article. In a preferred embodiment, the selection is carried out by a keyword matching process. This process preferably breaks down the article into weighted keywords and then compares those keywords to keywords associated with the profiles of potential reviewers. When the potential reviewers have been selected, each is contacted and requested to review the article. To help the potential reviewer with the decision, each reviewer is given an abstract of the article, along with other relevant information.

Upon acceptance of the reviewer position, the reviewer is given access to the complete article. The reviewer then examines the article and completes an evaluation form. When the evaluation is complete, the reviewer submits the evaluation to the journal. In one embodiment, the reviewer submits the evaluation through the journal's Web site. Alternatively, the reviewer could submit the evaluation via email.

After all of the reviews have been submitted, the editor responsible for the article makes a recommendation about the article. This process is illustrated in step 30. The editor reads the reviews along with any comments provided by the author and makes the recommendation. Next, the editorial staff for the journal makes its publication decision, as shown in step 40. In general, the publication decision can be to (1) publish the article, as seen in step 50; (2) reject the article, as seen in step 60; or (3) provisionally accept the article subject to certain required revisions, as seen in step 70.

If the article is provisionally accepted, subject to certain required revisions, the revision process is initiated, as illustrated in step 80. This process allows the author to edit the article, making changes where appropriate and as required by the editorial staff. When the author has completed the revision of the article, the author re-submits the article and the review process begins anew. However, in the iterative rounds of revision and review, the steps for selecting reviewers can be advantageously eliminated, as reviewers have previously been selected and assigned to the article.

1. Article Submission

Figure 2:
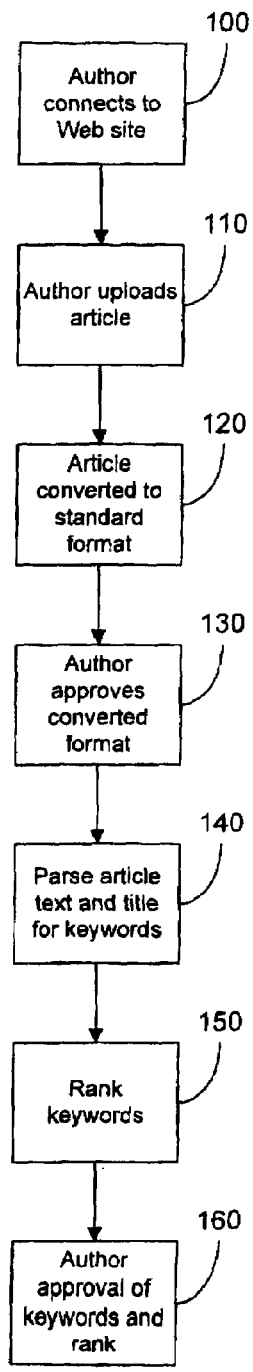
FIG. 2 is a flowchart of a process whereby an article is submitted to a journal by an author according to the present invention.

FIG. 2 is a flowchart of a process for the submission of an article by the author. In a preferred embodiment, the journal that receives the article has a Web page that is accessible to the entire Internet. In step 100, the author of the article connects to the Internet and using standard Web browser software the author connects to the journal's Web site. Once connected to the Web site, the author uploads the article to the journal Web site, as illustrated in step 110. For example, the author may use a standard Web browser to upload the article to the journal's Web site using the HTTP protocol. Alternatively, the author may use a standard Web browser or an alternative program to upload the article to the journal's Web site using the FTP protocol. Other protocols and programs are also available to convey the article from the author to the journal, and the present invention contemplates the use of such programs and protocols. For the sake of simplicity, the present description will focus, where appropriate, on the use of standard HTTP protocols.

After the author uploads the article to the Web site, the article is converted into a standard format, as shown in step 120. In one embodiment, the Web site is configured such that the article is automatically converted from the author's native format into the journal's standard format. For example, the author may write the article in any of several document processing applications, such as Microsoft Word, Word Perfect, Page Maker, Frame Maker, and the like. In one embodiment, the Web site is able to convert any native format into the journal's standard format.

After the article has been converted to the standard format, the resulting article is presented to the author for review. This process is demonstrated in step 130, where the author is given the opportunity to approve of the converted format. If the author does not approve, the author may make adjustments to the standard formatted article until the article meets the author's approval. In an alternative embodiment, the author may contact staff at the journal to resolve any outstanding formatting issues. In one embodiment, after the article has been reformatted, a document versioning tree is established for the article. This allows multiple versions of the article to exist so that no version is lost in the revision and review process previously described with reference to FIG. 1. Additionally, in an alternative embodiment, after submission the article may be marked as draft to allow the author or authors time to collaborate on desired revisions prior to complete submission of the article to the journal.

In step 140, after the article has been submitted and reformatted, the text and title of the article is parsed to reveal certain keywords associated with the article. For example, words such as articles, prepositions, and conjunctions are first removed from the article. The remaining words are then ranked according to factors such as presence in the title of the article and the frequency and location of use in the text of the article. The ranking process is shown in step 150.

After the keywords have been parsed and ranked, the author is given an opportunity to approve the selected keywords and their relative rank, as illustrated in step 160. In one embodiment, the author may add and delete keywords from the list automatically generated by the journal's Web site. Additionally, the author may change the rank of the keywords in the list.

The author may also request that certain scholars or experts be considered as potential reviewers of the article. Correspondingly, the author may also request that certain experts or scholars not be considered as potential reviewers of the article.

After the article has been submitted, reformatted and approved by the author and the list of keywords has been generated, ranked and approved by the author, the submission process is complete.

2. Reviewer Selection

Figures 3, 4:
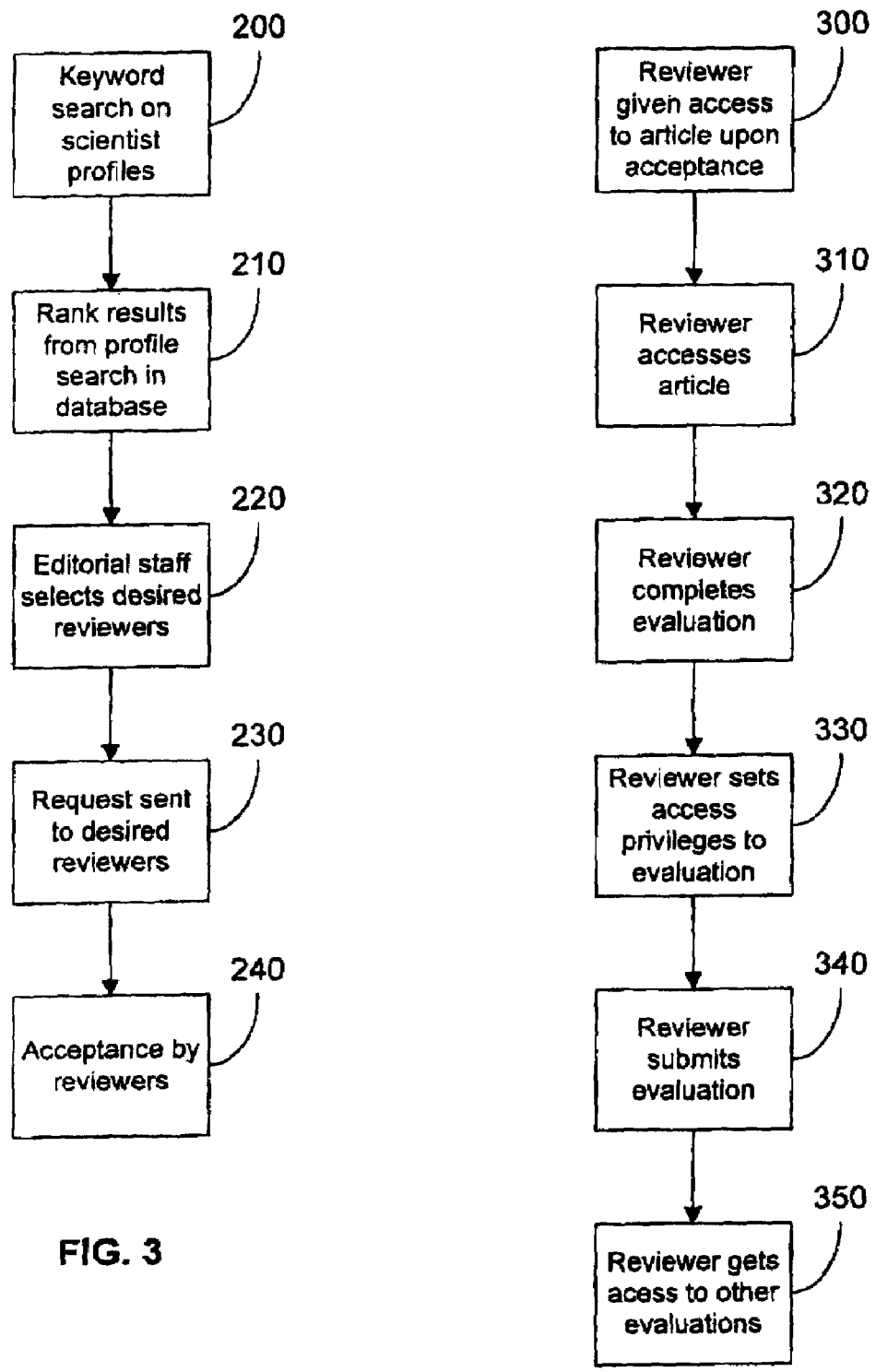
FIG. 3 is a flowchart of a method according to the present invention for selecting potential reviewers to review a submitted article.
FIG. 4 is a flowchart of a process according to the present invention for allowing a reviewer to gain access to a submitted article and complete an evaluation for that article.

A scholarly journal's publication process typically demands that peer review of articles be performed prior to an article being printed in the journal. In FIG. 3, a flowchart of a process for selecting reviewers is depicted. After the article has been submitted, the ranked list of keywords is preferably used to search the journal's database of available reviewers as shown in step 200. For example, the keyword search may begin with the highest ranked word from the list and compare that word to corresponding keyword fields in the profiles of scholars in the journal's database. The database may be automatically enhanced by allowing experts, scientists, and other scholars to complete a curriculum vitae form through the journal's Web site and submit that form to the journal. In one embodiment, the form contains all of the information needed to include the scholar in a subsequent search for potential reviewers. Continuing the example, after the highest ranked keyword is searched, the other keywords are similarly searched by rank.

In an alternative embodiment, if no potential reviewer profiles are found during the keyword search, the journal's Web site can access any of the many available external databases containing information and profiles regarding scholars and fields of expertise. For example, if no potential reviewers were found in the journal's own database, the Web site could access MEDLINE from the National Institute of Health, the Science Citation Index ("SCI") from the Institute for Scientific Information, Lexis-Nexis, or any other publicly available database or any other database available by subscription. In such a case, the journal's Web site would connect to the database over the Internet and submit a query requesting the names of authors who have published articles containing the ranked keywords. Additionally, the editorial staff at the journal may configure the Web site to refine the external database search to a specific subset of the information or journals contained therein.

As shown in step 210, once the search for potential reviewers is complete, the resulting profiles are ranked. In one embodiment, the profiles are ranked according to the potential reviewers familiarity with the subject matter of the article and the potential reviewer's past performance record for reviewing articles. For example, the past performance record may include factors such as timeliness, thoroughness, clarity, and the number of completed reviews. Additionally, the ranking could consider the number of reviews currently in progress by the potential reviewer. When the ranked list of potential reviewers is complete, the editorial staff selects the desired potential reviewers, as illustrated in step 220. Once selected, a message is sent to each potential reviewer, requesting that the potential reviewer agree to review the article. An abstract of the article may be included in the request to help the potential reviewer make a prompt and informed decision. The request may also include the title of the article, the author(s), due dates for the review, and instructions on how to accept.

In one embodiment, the Web site may automatically send a request by email to the top ranked potential reviewers. This list may be modified somewhat by suggestions for potential reviewers supplied by the author as discussed previously with reference to FIG. 2. The number of potential reviewers selected for automatic request by email may be set by the editorial board and configurable as a parameter in the journal's Web site. For example, if the editorial board determined that automatic requests should be sent to four potential reviewers for each article, the Web site would query the database to find the four top ranked scholars. Additionally, the list may be refined per the author's suggestions and an email would automatically be sent to each of the remaining four potential reviewers.

Finally, as shown in step 240, the potential reviewers agree to review the article for the journal. In one embodiment, the agreement method employed by the accepting reviewer is email. For example, a potential reviewer receives the request from the journal and reads through the abstract of the article. After reading through the abstract and deciding to review the article, the accepting reviewer sends an email to the journal's Web site indicating the accepting reviewer's agreement to review the article. Alternatively, the accepting reviewer could communicate the acceptance to the journal by connecting to the journal's Web site and indicating the acceptance. Advantageously, this automatic acceptance reduces the required editorial staff involvement and thereby reduces the required editorial intervention and management.

Additionally, an accepting reviewer could indicate the acceptance via facsimile, regular U.S. mail, telephone, or any of several other alternative methods. Preferably, when a predetermined number of potential reviewers have agreed to review the article, the journal's Web site automatically closes the acceptance window and immediately notifies all outstanding potential reviewers who have not accepted that their services will not be needed.

In one embodiment, if no reviewers have agreed to review the article by a predetermined date, the Web site automatically sends another request to the same set of potential reviewers. This second request may relax the deadlines for review in an attempt to entice the potential reviewers into acceptance of the reviewing responsibilities.

3. Article Review

Immediately after the journal receives the reviewer's acceptance, the journal's Web site makes the full text of the article available to the reviewer. This part of the overall process is illustrated in step 300 of FIG. 4. In step 310, the reviewer accesses the article on the Web site. In a preferred embodiment, the reviewer must log into the Web site using a predetermined password. In this fashion, access to the article is password protected and not generally available to the public. In one embodiment, the reviewer downloads the article to a local workstation for off line review. In an alternative embodiment, the reviewer conducts the review while connected to the Web site.

While connected to the journal's Web site, the reviewer can input relevant comments about the article into an evaluation form. In one embodiment, the reviewer can download the form from the Web site and enter comments directly into the form while off line. The form may be an email template that the reviewer can email to the editorial staff at the journal upon completion. In an alternative embodiment, the reviewer can enter relevant comments into any document type while off line and then later use the well known cut and paste utilities to enter the comments into the evaluation form while connected to the Web site. In another alternative embodiment, the reviewer can simply upload the local document containing the evaluation to the Web site.

Furthermore, the Web site may support the storing of partially complete evaluation forms. For example, when the reviewer first accesses the article, the reviewer, while connected to the Web site, enters several initial comments into the evaluation form and labels that form as a draft. Later, while off line, the reviewer enters several more comments into a document stored locally on the reviewer's computer. When the reviewer has completed the review, the reviewer connects to the journal's Web site and uses the well known cut and paste utilities to insert the rest of the reviewer's comments into the evaluation form. When the reviewer has completed the evaluation form, as shown in step 320, the form is ready for submission to the editorial staff at the journal.

In step 330, the reviewer has the ability to set certain access privileges on the evaluation. For example, certain fields of the evaluation form are confidential between the reviewer and the editorial staff. However, the reviewer may elect to open up access to those fields so that other reviewers and possibly the author may access those fields. In one embodiment, each reviewer is granted access to submitted evaluation forms only after that reviewer has submitted an evaluation form. Advantageously, this maintains the integrity of each reviewer's evaluation of the article. As evaluation forms are submitted, each reviewer may be notified that the other reviewer has submitted the evaluation form. As illustrated in step 340, once a reviewer has completed the evaluation form, that form is submitted to the journal's editorial staff. Furthermore, as mentioned above and shown in step 350, after the reviewer has submitted an evaluation form, that reviewer may access other submitted evaluation forms for comparison.

Figure 4A:
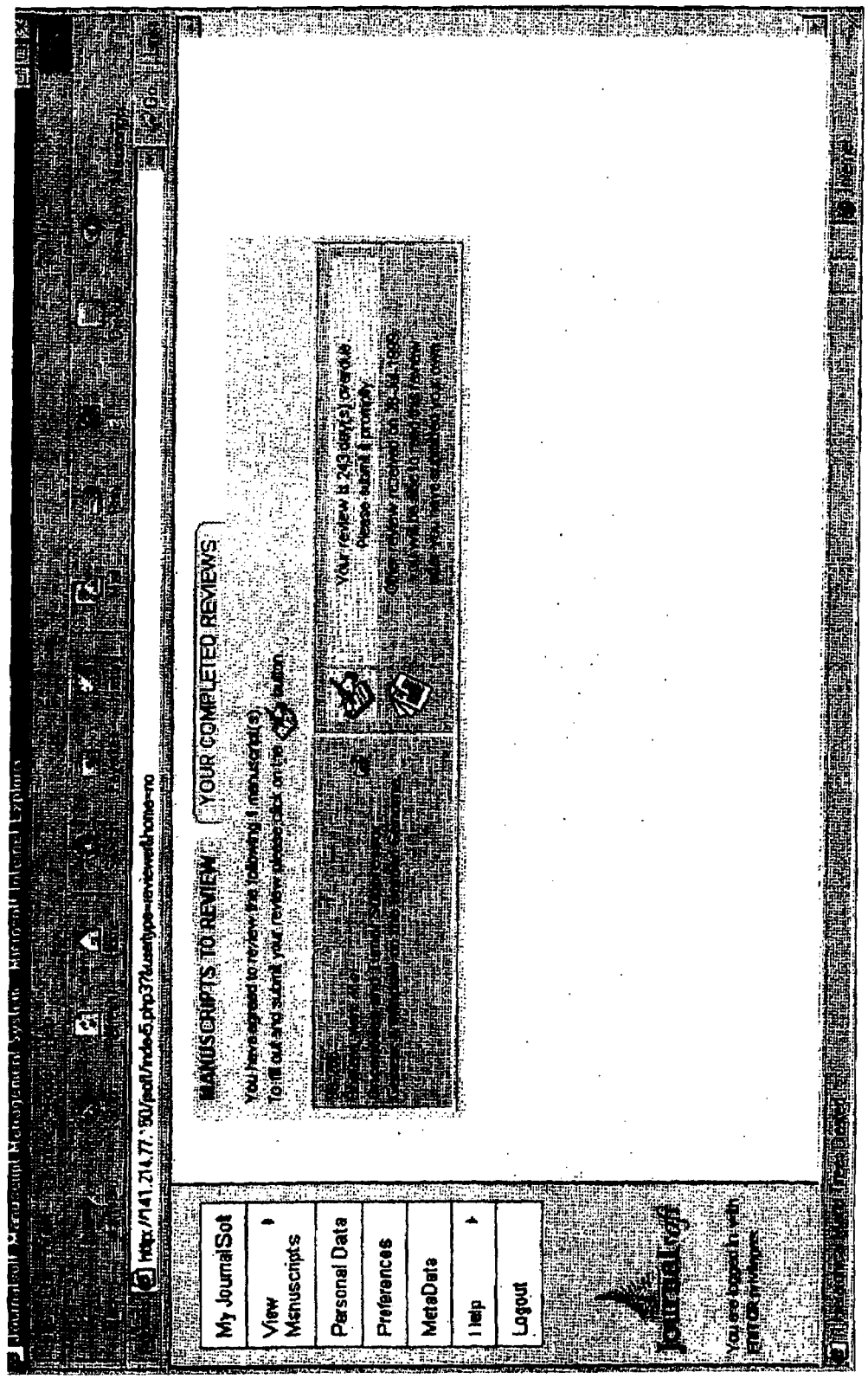
FIG. 4A is a software application window illustrating a prototype of a status page displayed to an article reviewer by a journal's Web site according to one embodiment of the present invention.

In one embodiment, a reviewer can connect to the journal's Web site and view the status of any outstanding reviewing commitments as well as the reviewer's completed reviews. FIG. 4A is an application window that illustrates a prototype of a review status screen. For example, when a reviewer logs into the journal's Web site, the reviewer can select to view all of the articles/manuscripts that the reviewer is responsible for. In FIG. 4A, the reviewer is presented with the single outstanding article waiting for review. Advantageously, notes are displayed in the example window that inform the reviewer when the present review is due and when the other reviewers submitted completed reviews.

Figure 4B:
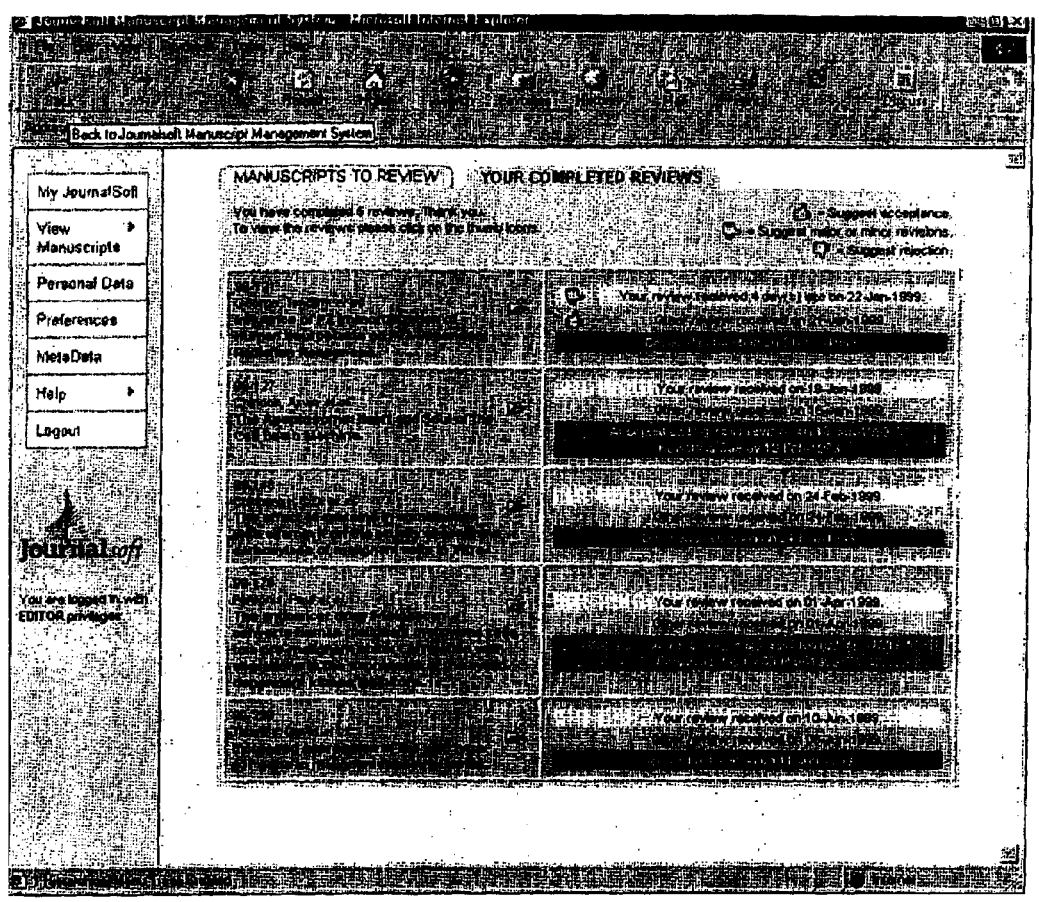
FIG. 4B is a software application window illustrating a prototype of a status page displayed to an article reviewer by a journal's Web site according to one embodiment of the present invention.

In FIG. 4B, the reviewer is presented with the status of each completed review. As illustrated in this prototype application window, the information displayed in the window may indicate when the review was received by the journal, whether the review was timely or late, when the other reviews were received, and the publication decision made by the editorial board.

Figure 4C:
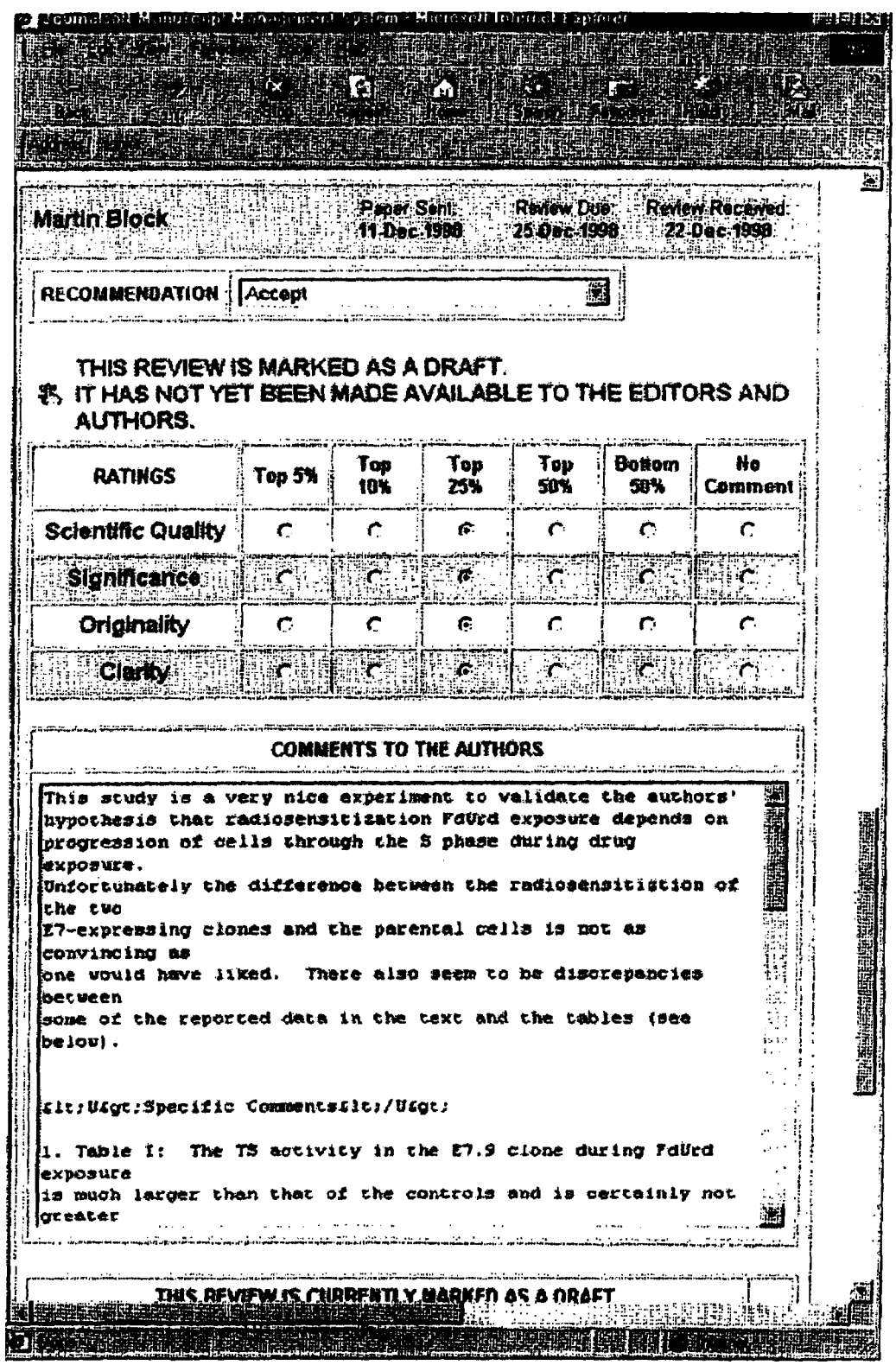
FIG. 4C is a software application window illustrating a prototype of an on line evaluation form displayed to an article reviewer by a journal's Web site according to one embodiment of the present invention.

FIG. 4C is a software application window illustrating a prototype of a journal's Web page evaluation form. This form may be used by a reviewer while on line to enter comments about the article. In one embodiment the reviewer can indicate that the comments are currently in draft form so that the incomplete comments will not be forwarded to the journal until the review is finalized. Advantageously, the evaluation form displays relevant information regarding the status of the review such as the data the article was received by the journal, the date the review was sent to the reviewer, and the date the review is due. If the review is overdue, the due date may be accentuated to call the reviewer's attention to the delinquent status. For example, the due date may be displayed in a red colored font to indicate when the review is overdue.

4. Author's Response

Figure 5:
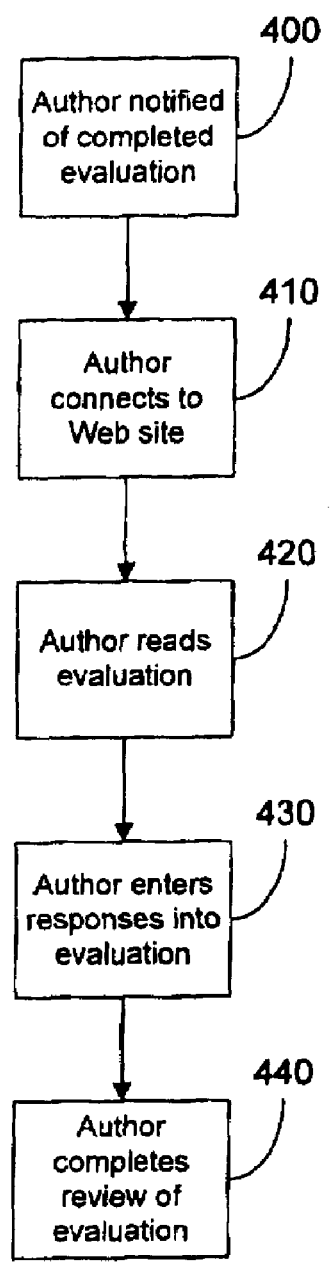
FIG. 5 is a flowchart of a method according to the present invention for allowing the author of a submitted article to respond to comments of the reviewer.

FIG. 5 is a flowchart of a process that allows the author to respond to a reviewer's submitted evaluation form. This "first response" capability is extremely useful to the editor when making the publication recommendation. As seen in step 400, the author is notified when each evaluation form is complete and submitted. In one embodiment, the author is automatically notified that an evaluation form has been completed, immediately after the journal's Web site receives the evaluation form. For example, when the reviewer sends the evaluation form into the journal via email, the journal receives the email, recognizes which article the evaluation form is referencing, and then sends an email notifying the author that an evaluation form has been received. Next, the author connects to the Web site and reads the evaluation, as illustrated in steps 410 and 420.

Advantageously, the author is able to enter remarks and respond to the reviewer's comments directly within the text of the evaluation form. For example, while reading the evaluation form, the author realizes that the reviewer misunderstood a particular example in the article. In the evaluation form, where the reviewer discusses the confusing example, the author inserts a response, clarifying any confusing language and suggesting alternative language or even an alternative example. In one embodiment, the author's remarks that are entered directly into the evaluation form are visually set apart from the reviewer's comments. For example, the author's remarks may be surrounded by a box, the font may be a different size, color or typeface, and the font may be highlighted in some fashion, such as in bold or italic letters.

After the author has entered all of the necessary and relevant responses into the evaluation form, the author completes the examination of the evaluation form, as shown in step 440. In one embodiment, the editor assigned to the article is notified when the remarks from the author have all been entered.

FIG. 5A is a software application window illustrating a prototype of an on line evaluation form that includes the remarks entered by the author. Preferably, the remarks from the author are set apart from the comments made by the reviewer. In FIG. 5A, the authors remarks are enclosed in a box within the text of reviewers comments. Advantageously, this provides context sensitive author responses to the comments made by the reviewer. The remarks made by the author may be additionally identified by being presented in a different color font. For example, the comments from the review may be displayed in a standard black color font. The author's remarks are then inserted into a separate box, to differentiate those remarks from the reviewer's comments. Additionally, the author's remarks in the separate box may be displayed in a blue color font. This makes the author's remarks even more distinct and simplifies the editor's examination of the review and corresponding remarks.

5. Editor's Recommendation

Figure 6:
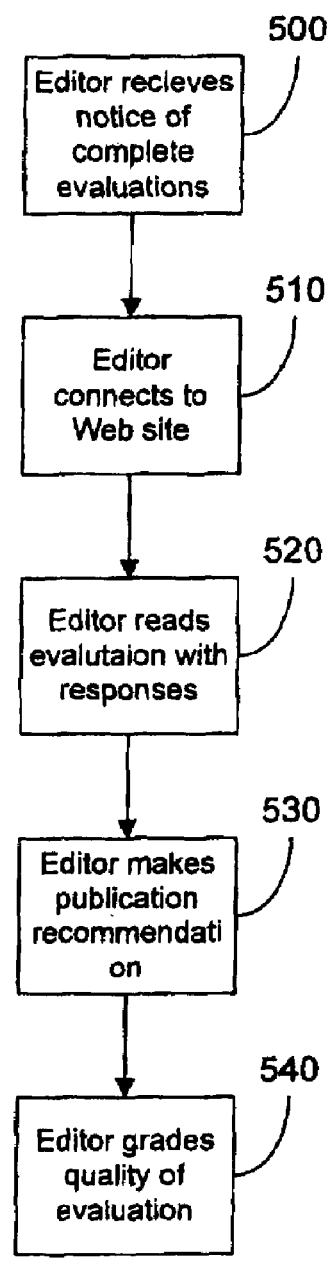
FIG. 6 is a flowchart of a method according to the present invention whereby an editor can consider the reviews for an article and the authors remarks in order to arrive at a publication recommendation.

Turning to FIG. 6, a method for an editor to arrive at a publication recommendation is shown. As discussed above, in step 500 the editor is notified when an evaluation has been completed by the reviewer and the author has completed the response. The editor may be notified by the editor's preferred method, which is declared by the editor in the editor's profile. In one embodiment, the editor is first notified when the reviewer completes the evaluation form and then later notified when the author has finished entering remarks into the evaluation form. Upon such notice, the editor connects to the Web site and reads the evaluation and the corresponding remarks from the author, as illustrated in steps 510 and 520.

In one embodiment, the editor is able to see a point by counter-point discussion between the reviewer and the author, respectively. Preferably, this discussion facilitates an accelerated publication recommendation by the editor, as seen in step 530. In an alternative embodiment, the editor's recommendation on publication could be final. For example, if a journal employed a flat organizational structure, the individual article publication decisions may be made by the editor for each subject area.

In one embodiment, after the editor has made the publication recommendation, the editor additionally completes an evaluation of the reviewer. This evaluation grades the quality of the reviewer's evaluation. For example, the evaluation of the reviewer could be based upon factors such as timeliness, thoroughness, and tactfulness. These evaluations may become part of the reviewer's profile and aid the editorial staff when subsequently selecting equally ranked potential reviewers, as discussed previously with reference to FIG. 3.

6. Publication Decision

Figures 7, 8:
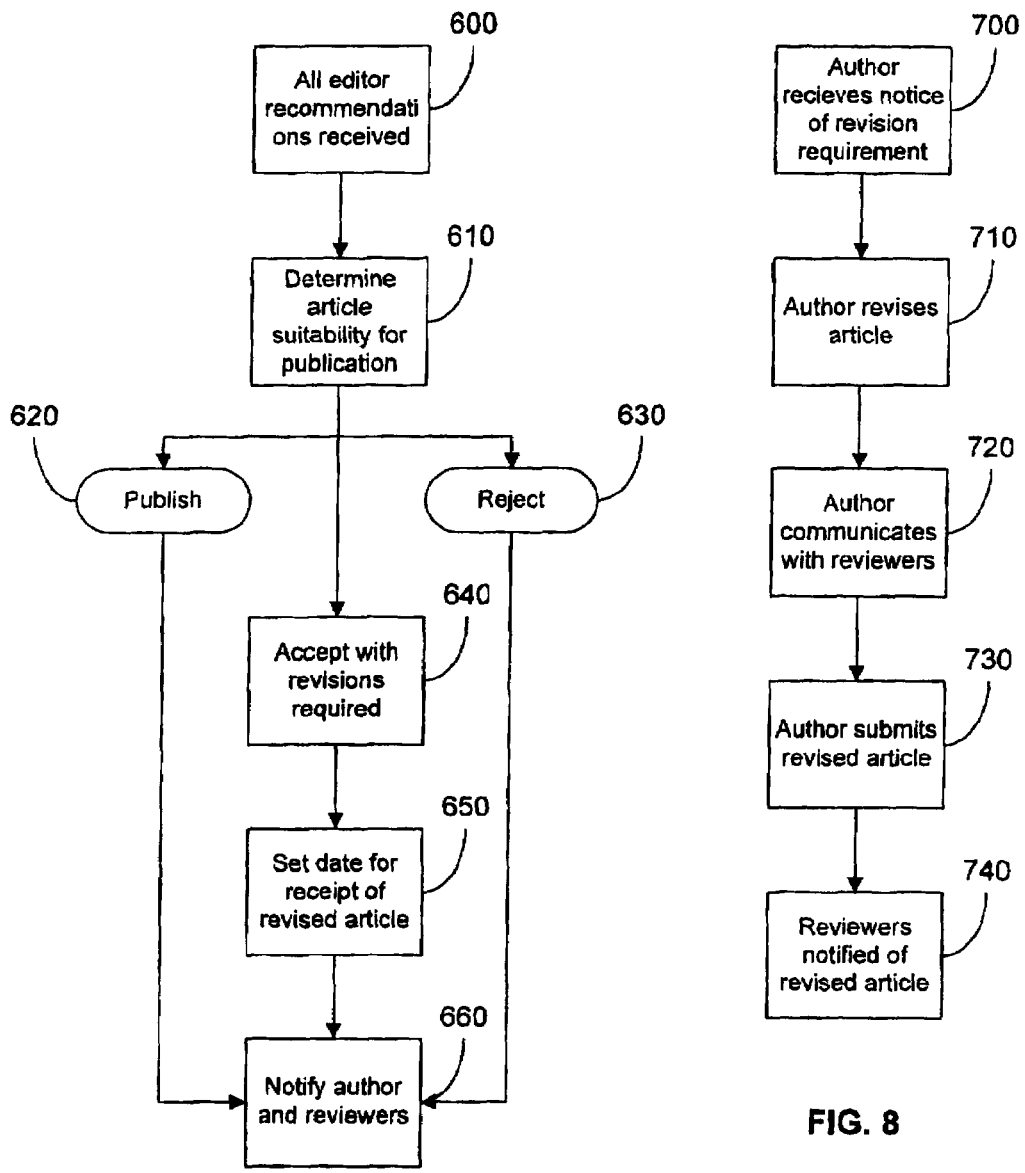
FIG. 7 is a flowchart of a process that an editorial board can use to facilitate a publication decision according to one embodiment of the present invention.
FIG. 8 is a flowchart of a process for revising an article after the article has been submitted to a journal and reviewed by a reviewer according to the present invention.

After all of the editor's recommendations have been received the editorial board makes its publication decision. In one embodiment, there is only one editor assigned to each article. In an alternative embodiment, more than one editor may consider the reviewers' evaluation forms and the author's corresponding remarks. FIG. 7 is a flowchart of a process that an editorial board can use to facilitate the publication decision. As shown in step 600, all of the editor recommendations have preferably been received by the editorial board.

Next, in step 610, the editorial board reflects upon the editor recommendations and determines the suitability of the article for publication. In one embodiment, the editorial board has three categories of suitability for an article. First, the article may be accepted for publication in its present condition, as seen in step 620. Second, the article may be rejected outright, as seen in step 630. Third, the article may be provisionally accepted subject to certain revisions that are required by the board, as illustrated in step 640. In alternative embodiments there may be several more determinations that an editorial board may make. For example, the board may determine that the article is suitable for publication in the distant future, or the article may be suitable for publication but untimely and therefore rejected. Thus, the article may be given any of a number of other possible determinations, subject only to the needs of the editorial board.

Advantageously, in one embodiment the editorial board can arrive at the publication decisions through on line communications. For example, the editors may communicate with each other through email or other types of notification procedures offered by the Web site. In one embodiment, the editors may take part in one or more virtual conferencing sessions facilitated by the Web site in order to communicate with each other and arrive at publication decisions for the articles under review.

After the publication decision has been made by the board, the board additionally sets a timeline for the revision process, including the date for receipt of the revised article, as illustrated in step 650. Finally, as shown in step 660, the editorial staff notifies the author and the reviewers of its decision. A notice of provisional acceptance may include the due date for receipt of the revised article.

7. Revision Process

When the editorial board determines that the article is provisionally accepted for publication, the author then edits the article to make the necessary changes. FIG. 8 shows a process whereby the author can efficiently make those changes within the time frame set by the editorial board. Beginning with step 700, the author receives notice of the provisional acceptance. Next, the author makes the necessary edits as shown in step 710. Advantageously, the journal's Web site allows the author to communicate with the reviewers in order to clarify comments and receive preliminary approval from the reviewers on changes to the article. In one embodiment, the identity of the reviewers remains anonymous throughout the revision process.

For example, an author receives notice that the article must be revised. The author then connects to the journal's Web site to consult the comments made by the reviewers. Based on these comments, the author makes changes to the article. However, the author is uncertain whether the reviewers will approve of the changes made by the author. Therefore, the author connects to the journal's Web site again and sends a communication to the reviewers, inviting commentary on the author's proposed changes. After receiving feedback from the reviewers, the author completes the revision and resubmits the article, as shown in step 730. In one embodiment, the reviewers are automatically notified in step 740 that the revised article has been resubmitted and is ready for review.

Referring back to the overview in FIG. 1, after the author submits the revised article, the review process in step 20 begins again. This is the beginning of a second cycle of the article through the peer review process. However, new reviewers are not selected for subsequent iterations of the peer review process as reviewers have already been selected for the article. After the second review process is completed, the revised article passes on to a second editorial recommendation in step 30 and ultimately to a second publication decision as described above in step 40 of FIG. 1. As can be seen, the process that a submitted article goes through is cyclical. A single article may iterate through the above-described processes several times before it is ultimately accepted for publication or finally rejected.

When an article is finally accepted for publication, the article may be passed to a copy editor. The copy editor formats the article in the proper publication format for the particular journal. This final format may then be delivered to the author and the editor for review. After the author and editor have reviewed and approved of the galley proof, the article may be immediately published on line to the journal's Web site. Later, the article may be published in print.

Alternatively, the a synopsis or abstract of the article may be published on the journal's Web site. This tickler type of publishing may be used to inform the public and any visitors to the journal's Web site that the article will be published in a future issue of the journal. Advantageously, the synopsis or abstract may also indicate the expected date of publication and the expected form of publication. For example, the synopsis on the journal's Web site may indicate that the article will be published in next quarter's printed version of the journal, or perhaps in next week's on line version of the journal.

B. Example Embodiments

Below, example implementations of the present invention are described to provide further detail of several possible applications of the present invention. The recitation of these example embodiments is included to provide additional description and in no way should be construed to limit the broad scope contemplated by the present invention.

1. User Profiles

In one embodiment, each party interacting with the journal's Web site has a user profile. The user profile is set up during the user's first interaction with the Web site. For example, the first time a scholar, technician, or expert in a particular field connects to the journal's Web site, whether by referral or by personal or professional interest, the user encounters a series of registration screens. FIGS. 9–14 are examples of possible registration screens that a new user might encounter.

Figure 9:
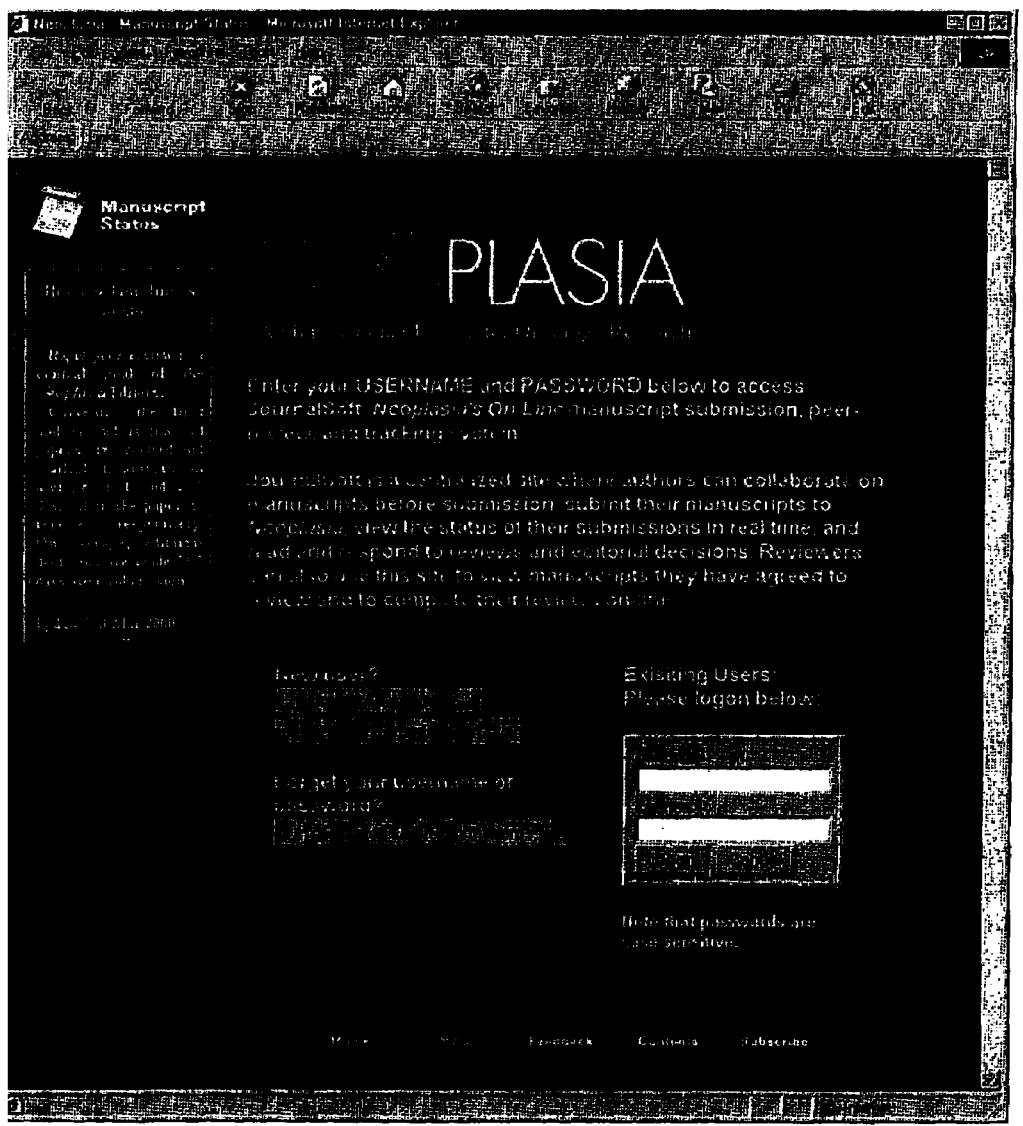
FIG. 9 is a software application window illustrating a prototype of a login screen for a journal's Web site according to one embodiment of the present invention.

Initially, in FIG. 9 a user first connects to the journal's Web site. If the user is an existing user, then that user may simply log into the journal's Web site by entering the correct username and password combination. However, if the user is a new user, that user will need to create an account before gaining access to the rest of the journal's Web site. In this way, the Web site can restrict access to confidential material such as pending articles under peer review.

Figure 10:
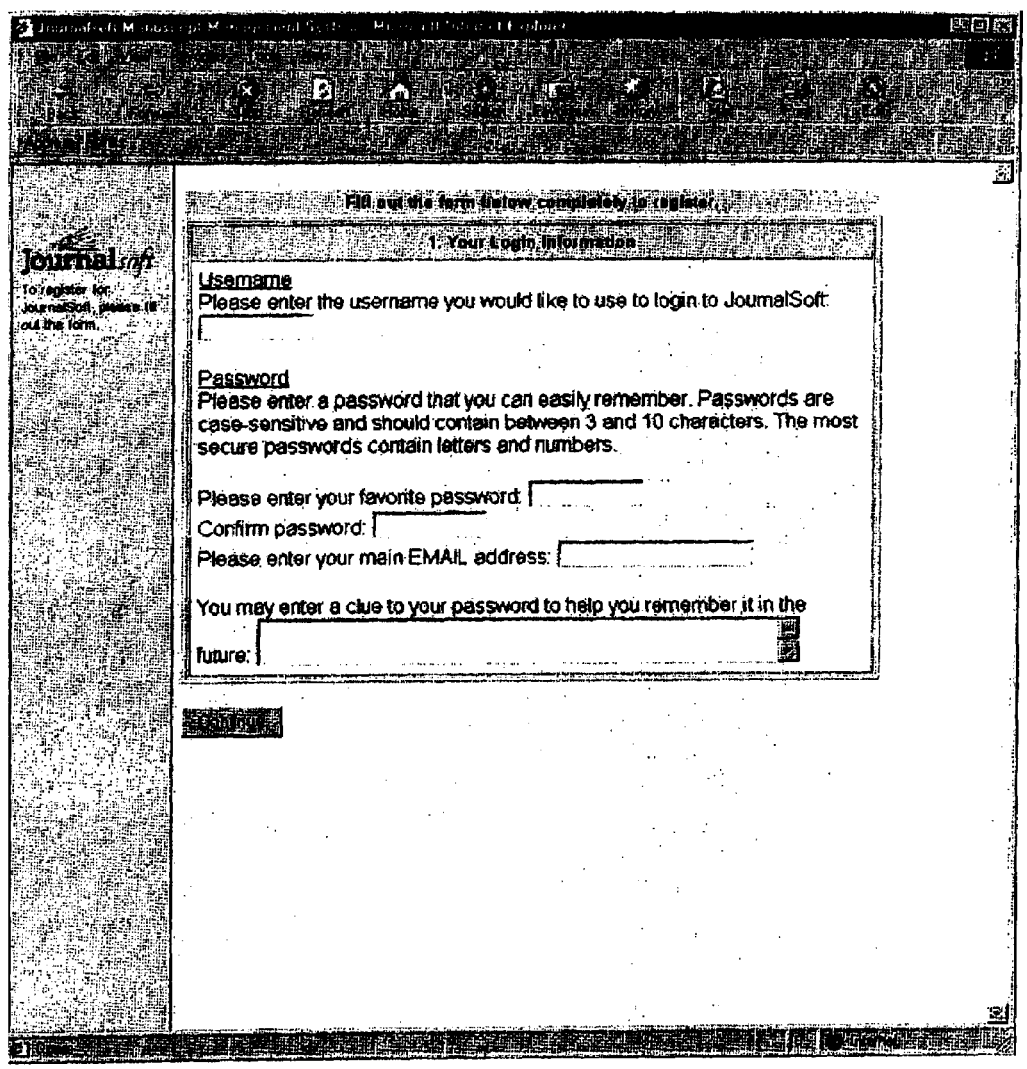
FIG. 10 is a software application window showing a prototype of a registration screen for a journal's Web site according to one embodiment of the present invention.

After selecting to create a new account, in FIG. 10 the first registration screen prompts the new user to enter a username and a password. This username and password combination will provide the user with access to the journal's Web site in the future. The initial screen in this embodiment also asks for the user's main email address, which may be used when communicating with the user in the future.

Figure 11:
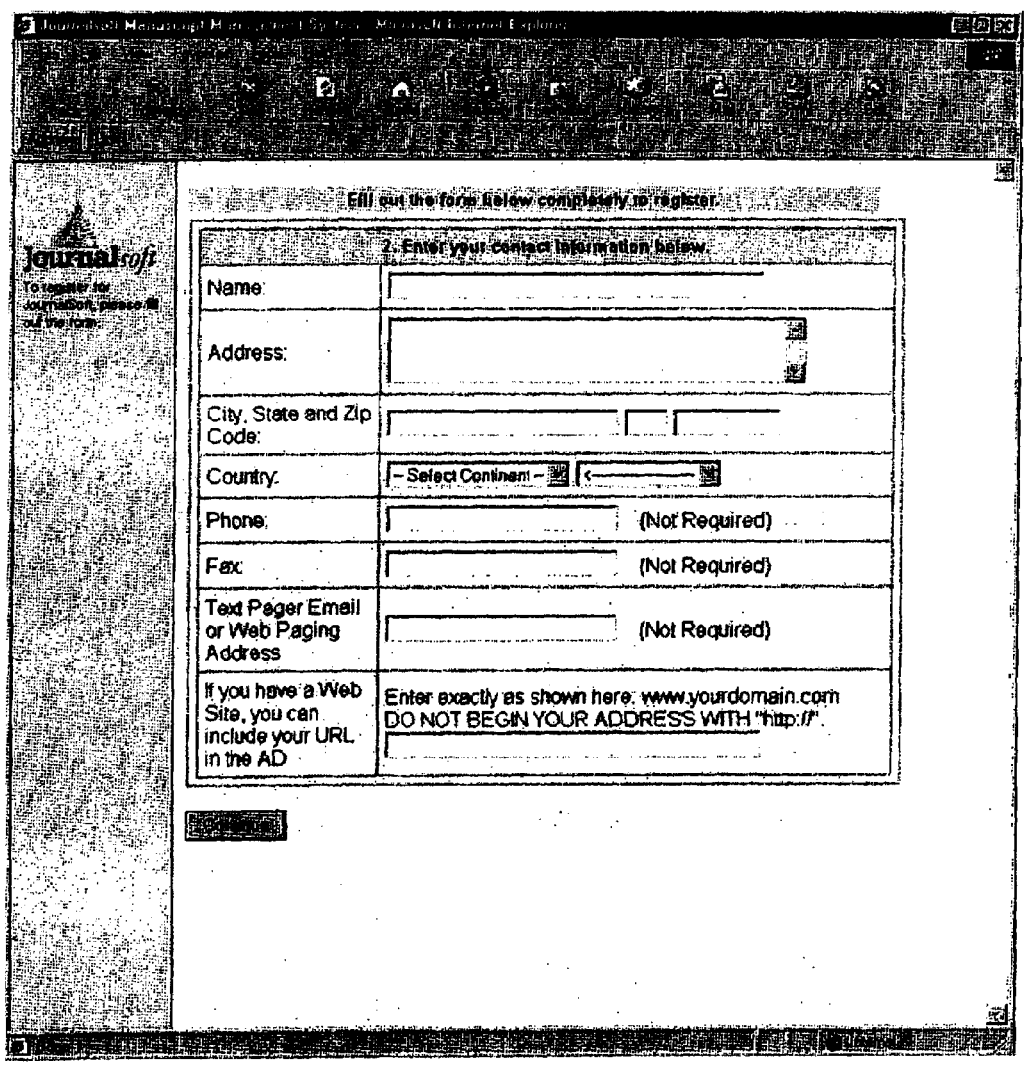
FIG. 11 is a software application window showing a prototype of a registration screen for a journal's Web site according to one embodiment of the present invention.

In FIG. 11, the registration screen prompts the user to input additional contact information. For example, the user's name, street address, city, state, zip, country, phone, facsimile, and other information is gathered here. Additional information may also be gathered, such as the user's text pager number and associated uniform resource locator ("URL") as seen here. As also seen on this registration screen, certain fields may not be required, giving the new user an option to not divulge that information.

Figure 12:
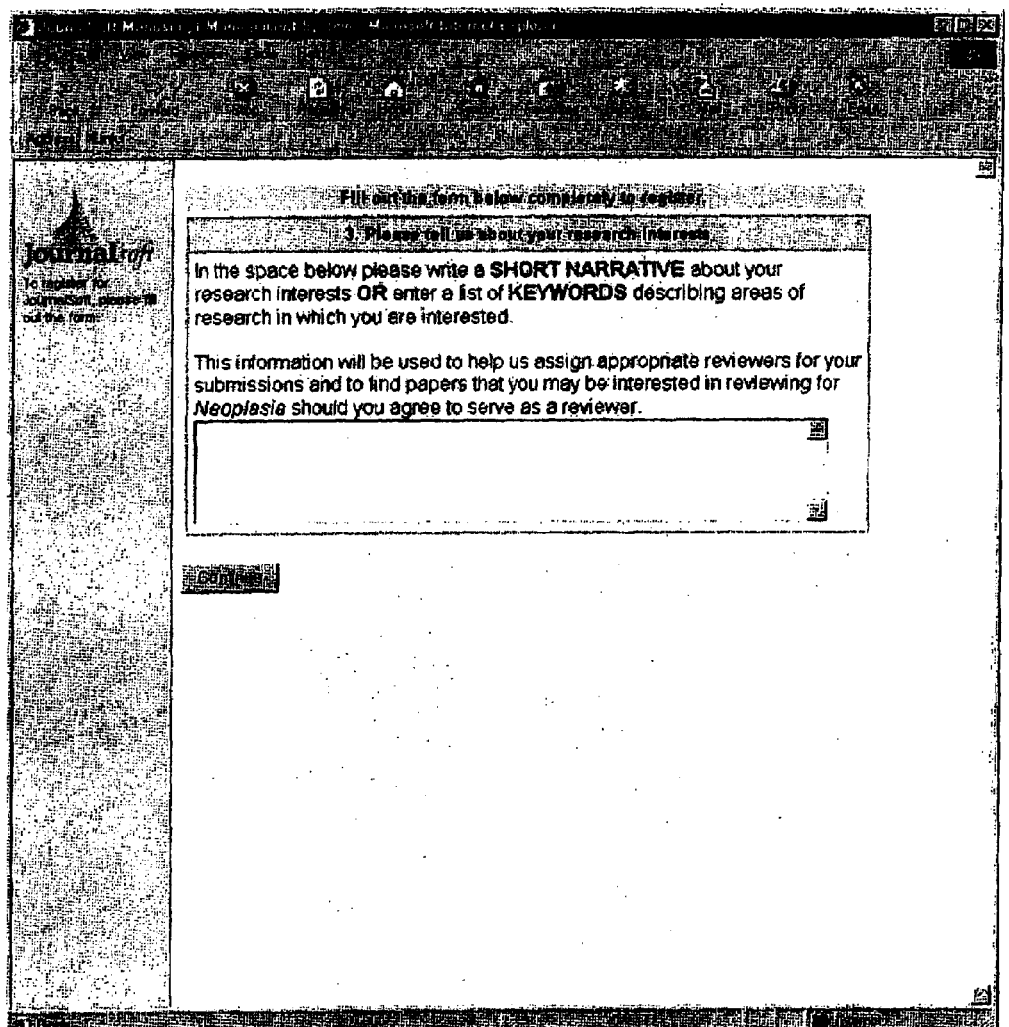
FIG. 12 is a software application window showing a prototype of a registration screen for a journal's Web site according to one embodiment of the present invention.

In FIG. 12, the new user is prompted to enter the user's area of expertise. In this example, the user is allowed to write a short narrative in a free form text entry window. Alternatively, the registration screen may suggest that the user enter keywords to describe the user's area of interest or expertise.

Figure 13:
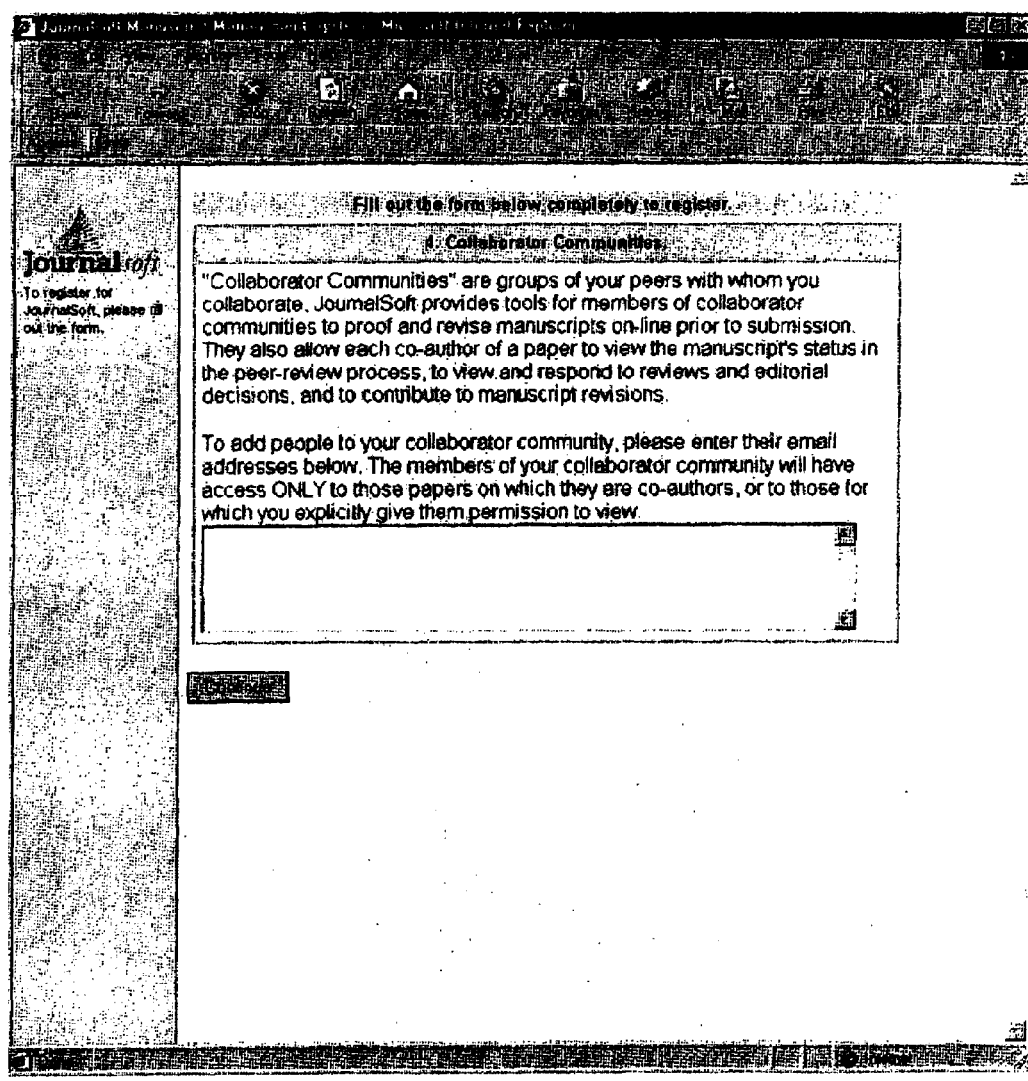
FIG. 13 is a software application window showing a prototype of a registration screen for a journal's Web site according to one embodiment of the present invention.

In FIG. 13, the new user is asked to enter the user names of other individuals who the new user would like to be associated with in a peer group. This group of peers is referred to as a "Collaborator Community" and provides each member of the group access to collective works.

Figure 14:
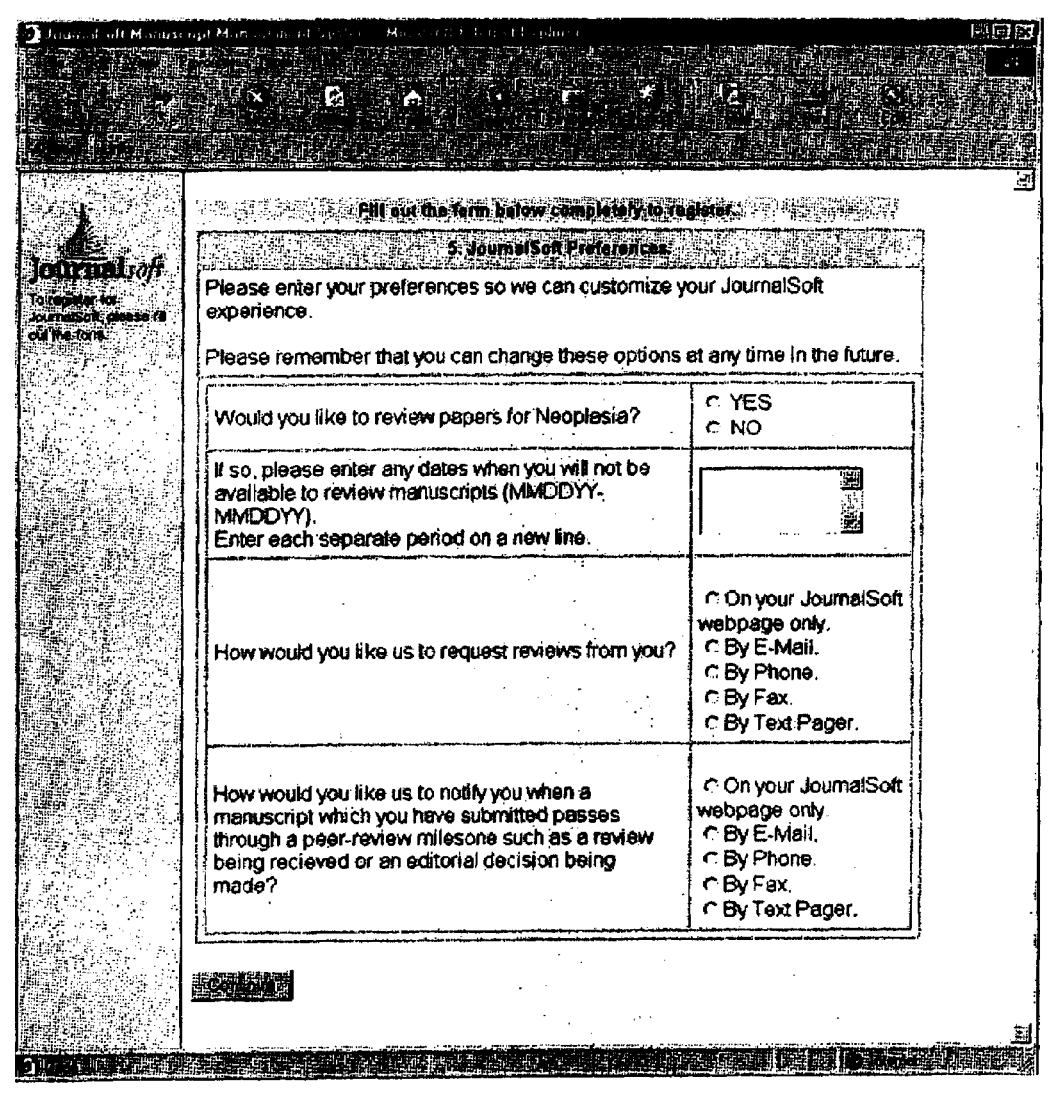

In FIG. 14, the user is prompted to select certain preferences associated with the user's status as a potential reviewer. For example, the registration screen illustrated here asks if the user would like to be considered as a reviewer for the journal. Additionally, the user is asked to select the preferred contact method for the journal's reviewer requests to the user. Also, the user is asked to supply certain timeframes that the user is unavailable. Additional information could also be sought by the journal to more efficiently select potential reviewers.

Also in FIG. 14 is a request for information from the new user regarding the user's status as an author. Specifically, in this example registration screen, the user is prompted to select the preferred contact method for the journal's automatic notification to authors when a milestone is reached in the peer review process.

An advantage of implementing the user profile embodiment is realized in the resulting password protected nature of the peer review process, the streamlined communication between the parties involved, and the enhanced database of potential reviewers created from the user profiles. For example, when an existing user submits an article to the journal, the journal already knows the user's primary email address and preferred contact information. Additionally, when the Web site finds and ranks the potential reviewers, the area of expertise, primary email address, and other preferred contact information of that potential reviewer are known. Additionally, the user profile record can be used by the journal database to store information regarding the reviewer's habits of timeliness, thoroughness, and general recommendation.

Figure 15:
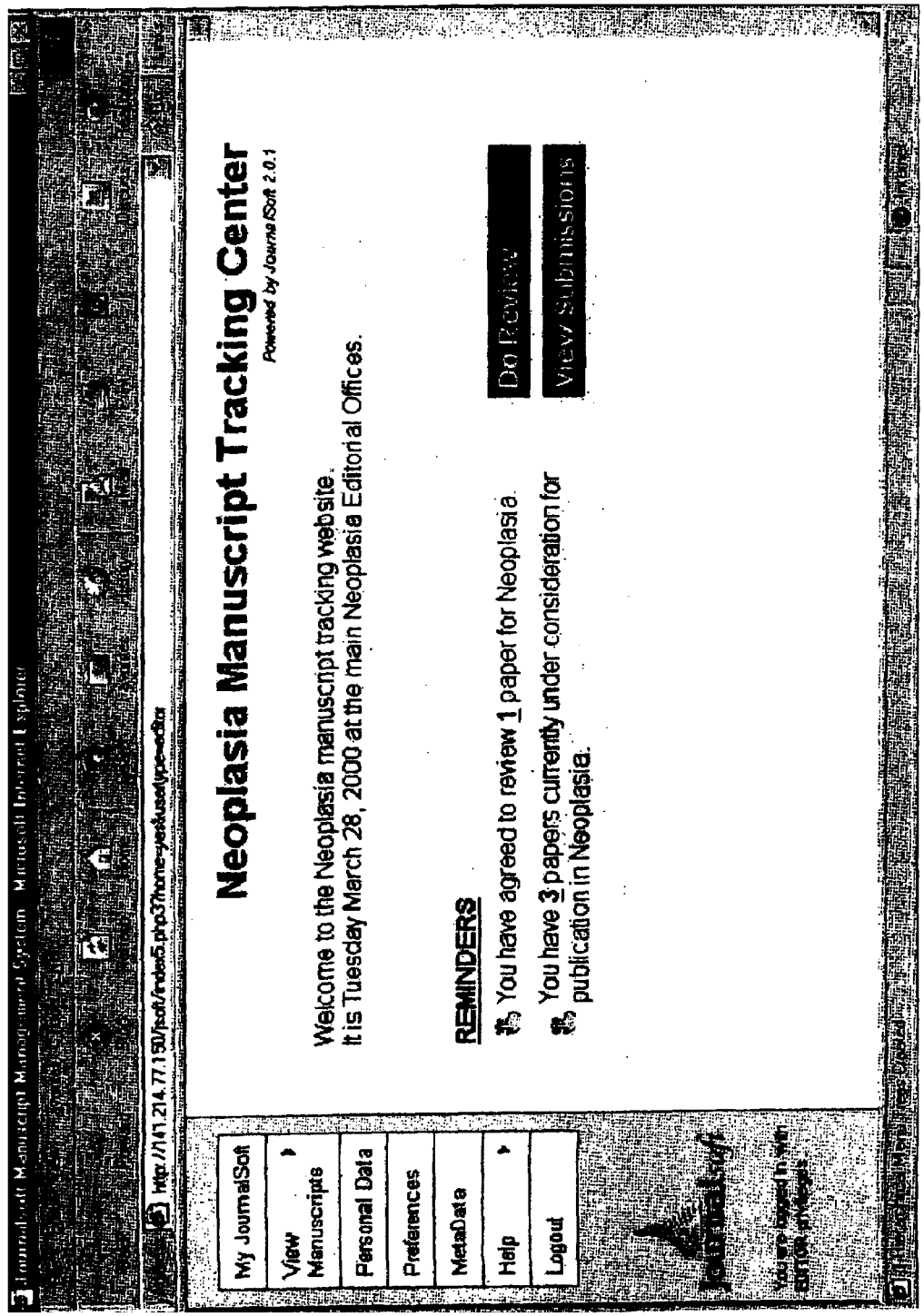
FIG. 15 is a software application window showing a prototype of a user's default screen from a journal's Web site according to one embodiment of the present invention.

Additional advantages are realized each time a user connects to the journal's Web site and logs in. This advantage is evident from FIG. 15 which shows an existing user's home page within the journal's Web site. As can be seen, a reminder of the number of outstanding articles the user has submitted to the journal is prominently displayed. Additionally, a reminder of the number of article the user has agreed to review is similarly displayed. In this fashion, the user is able to keep track of both submissions and reviewing responsibilities from one easy location.

2. Collaborator Communities

As briefly described above with reference to FIG. 13 one embodiment of the present invention includes the Collaborator Community functionality. This tool allows multiple individuals to collaborate on an article, working together as co-authors. For example, several users who may be geographically dispersed around the globe come together in the journal's Web site to form a collaborator community. As illustrated in FIG. 13, each user enters in the names of the other users that comprise the community. This gives each of the collaborators equal access to a draft article. One of the members of the community may be designated as the primary author, and that member correspondingly has the additional capability of submitting the completed article to the journal.

For example, several professors from different universities may come together at a convention and decide to co-author a work in their shared area of expertise. Through the journal's Web site, each professor joins the collaborator community, with one professor being designated as the primary author. Over time, each professor accesses the draft article through the journal's Web site and contributes an equal portion to the article. When the article is complete, the designated professor submits the article to the journal as described above with reference to FIG. 2.

Figure 16:
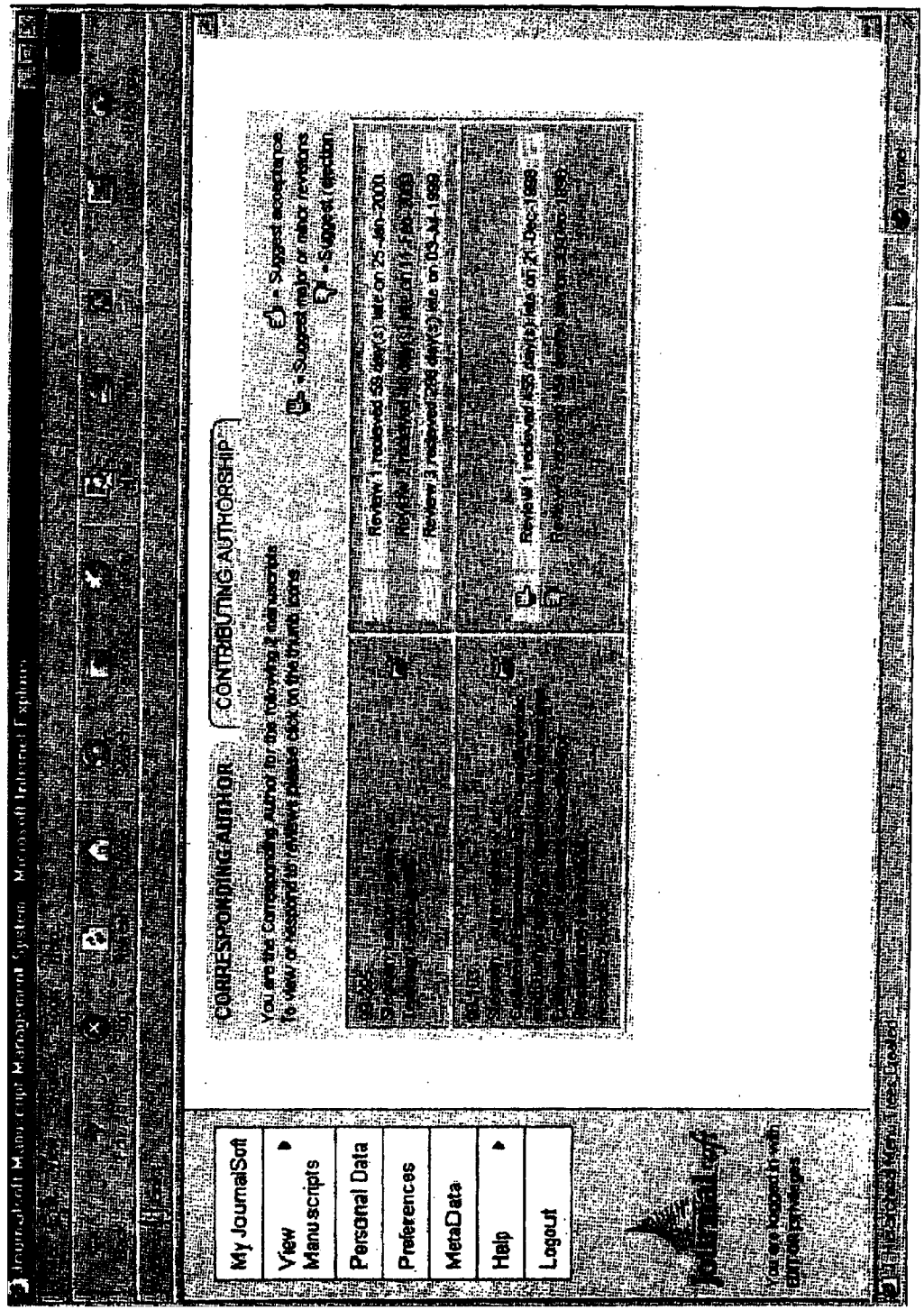
FIG. 16 is a software application window showing a prototype of a collaborating author's article summary screen from a journal's Web site according to one embodiment of the present invention.
Figure 17:
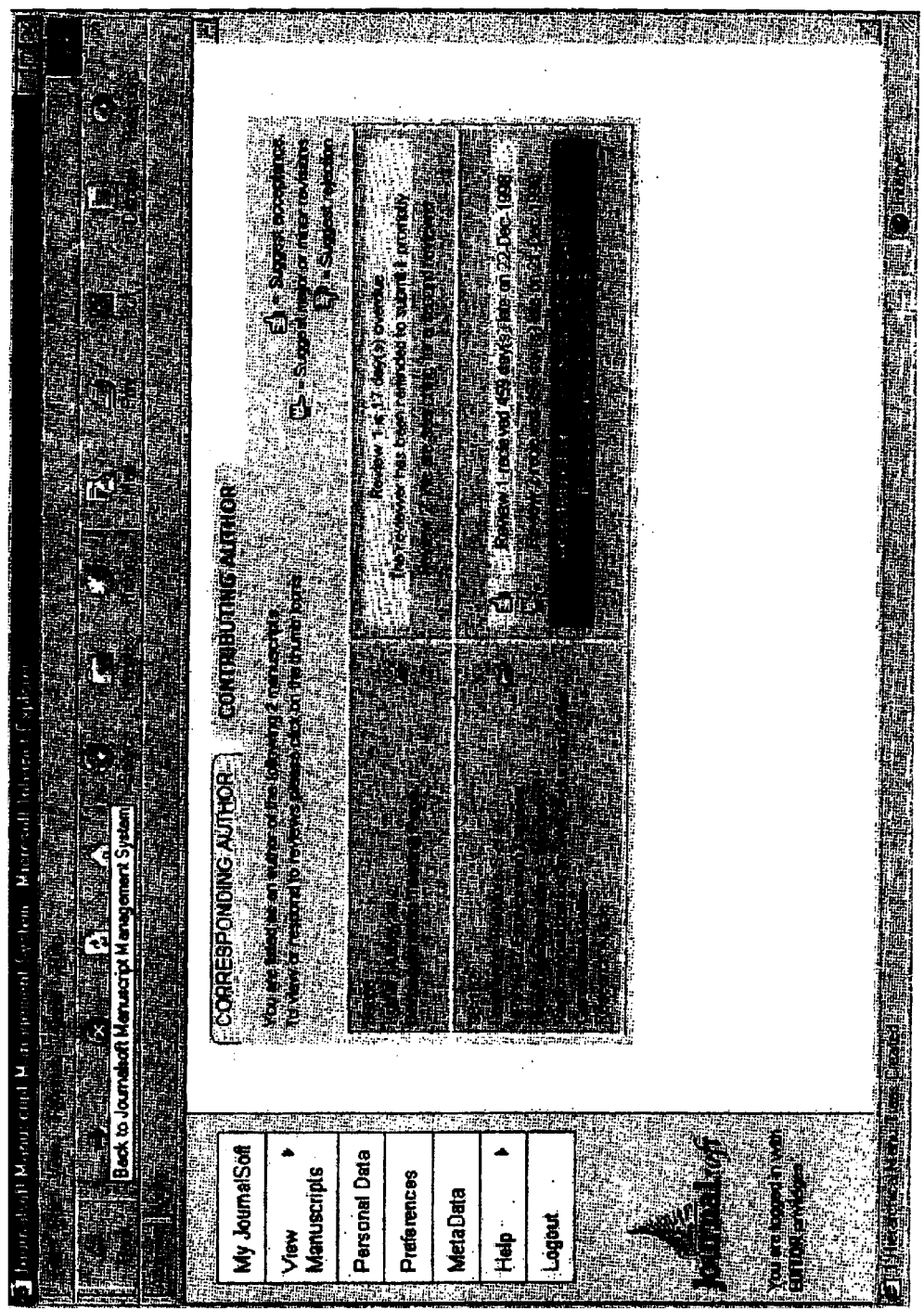
FIG. 17 is a software application window showing a prototype of a collaborating author's article summary screen from a journal's Web site according to one embodiment of the present invention.

As the review process proceeds, each notice delivered to the author is delivered to the designated professor and each of the other co-authors. For example, in FIG. 16 the designated professor would be referred to as the corresponding author while the other professors would be referred to as contributing authors. When the corresponding author logged in to the journal's Web site, the collaborative article would be displayed under the "CORRESPONDING AUTHOR" tab. When a contributing author logged into the journal's Web site, the collaborative article would be displayed under the "CONTRIBUTING AUTHORSHIP" tab, as illustrated in FIG. 17.

Continuing the example, when a reviewer completes and submits an evaluation form to the journal, each co-author is notified. Recall from the discussion of FIG. 5 that the author has the ability to respond to comments in the evaluation form. Advantageously, when the author is a collaborator community, each co-author in the community has equal access to respond to the comments made by the reviewer. In this fashion, each professor can access the evaluation form and enter remarks in the appropriate area. When all of the professors have completed their respective responses, the designated professor who is also the corresponding author submits the response to the journal.

As previously discussed with reference to FIG. 5a, the remarks of all of the co-authors are separated in the text from the reviewer's comments in the evaluation form. However, when separate co-authors respond in the same area of the evaluation form, those remarks are seamlessly collated into a single text block for the convenience of the editor. Thus, the collaborator community allows geographically disperse colleagues to come together through the journal's Web site and efficiently co-author an article.

3. Multi Journal Capabilities

Advantageously, the present invention is capable of handling the peer review process for a single journal as well as multiple journals. For example, in today's competitive scholarly journal environment, it is not uncommon for a single publisher to manage and produce a portfolio of journals covering a wide range of subject areas. Accordingly, the present invention is designed to allow a multi-journal publisher to implement its Web site as a full service portal to the publisher's entire journal portfolio.

For example, when a user creates an account with one of the journal's managed by the publisher, the user would be able to submit papers to any journal in the publisher's portfolio. Additionally, users that are in the potential reviewer database for one journal are also in the potential reviewer database for all of the journals in the publisher's portfolio. This allows the publisher to generate a larger, more well rounded database of potential reviewers in less time.

Furthermore, users that connect to the publisher's Web site have access to the status of pending articles that have been submitted to any of the journals in the publisher's portfolio. In a similar fashion, reviewers have access to the status of outstanding reviews for any of the journals in the publisher's portfolio.

An additional advantage realized in the multi-journal embodiment is the facilitation of the transference of articles and the peer review process between sister journals. For example, an author submits an article to the premier journal in the field that is the subject matter of the article. This journal is produced by a publisher with a portfolio of journals, some of which are in the same discipline as the premier journal. As the peer review process unfolds, it becomes clear to the article editor that the submitted article is more appropriate for one of the publisher's sister journals, and not for the premier journal. In response, the publisher can transfer the article to the sister journal without interrupting the peer review process.

For example, although the journal that the article was submitted to would change, the author's interface to information regarding the status of the article would remain the same. Similarly, the reviewer's interface to information regarding the status of the article would also stay the same. Also, the author can be easily notified of the change either through the publisher's Web site or by email or other traditional means. In this fashion, the present invention allows a single publisher with multiple journals to manage the peer review process amongst and between all of those journals using a single author, reviewer, and editorial interface.

While the particular methods for facilitating the peer review process herein shown and described in detail are fully capable of attaining the above described objects of this invention, it is to be understood that the description and drawings represent the presently preferred embodiments of the invention and are, as such, merely representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A computer implemented method for peer review over a communications network, comprising:
   receiving an article from an author via a communications network;
   extracting context information from the article;
   querying a database containing profiles of potential reviewers to determine a plurality of qualified reviewers based on the extracted context information;
   ranking the plurality of qualified reviewers;
   contacting each qualified reviewer and requesting that the qualified reviewer agrees to review the article;
   receiving an agreement from one or more qualified reviewers;
   providing the article to an accepting qualified reviewer;
   providing an evaluation form to the accepting qualified reviewer;
   receiving a completed evaluation form from the accepting qualified reviewer, wherein the accepting qualified reviewer completes the evaluation form online and each accepting qualified reviewer for an article has access to completed evaluation forms of other accepting qualified reviewers after submitting an evaluation form for the same article;
   providing the author with the completed evaluation form;
   receiving a response from the author directly in the completed evaluation form;
   providing the completed evaluation form with author responses to an editor;
   receiving a publication decision from the editor; and
   providing the publication decision to the author and the reviewer.

2. A computer implemented method for peer review over a communications network, comprising:
   receiving an article from an author via a communications network;
   extracting context information from the article;
   querying a database containing profiles of potential reviewers to determine a plurality of qualified reviewers based on the extracted context information;
   ranking the plurality of qualified reviewers;
   contacting each qualified reviewer and requesting that the qualified reviewer agrees to review the article;
   receiving an agreement from one or more qualified reviewers;
   providing the article to an accepting qualified reviewer;
   providing an evaluation form to the accepting qualified reviewer;
   receiving a completed evaluation form from the accepting qualified reviewer, wherein the accepting qualified reviewer completes the evaluation form online, each accepting qualified reviewer for an article has access to completed evaluation forms of other accepting qualified reviewers after submitting an evaluation form for the same article, and each accepting qualified reviewer can set access privileges for a section of the reviewer's completed evaluation form;
   providing the author with the completed evaluation form;
   receiving a response from the author directly in the completed evaluation form;
   providing the completed evaluation form with author responses to an editor;
   receiving a publication decision from the editor; and
   providing the publication decision to the author and the reviewer.

* * * * *